(12) United States Patent
Liu

(10) Patent No.: US 12,261,701 B2
(45) Date of Patent: Mar. 25, 2025

(54) HARQ PROCESS MANAGEMENT METHOD AND APPARATUS, TERMINAL, AND STORAGE MEDIUM

(71) Applicant: SPREADTRUM COMMUNICATIONS (SHANGHAI) CO., LTD., Shanghai (CN)

(72) Inventor: Xing Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 408 days.

(21) Appl. No.: 17/765,256

(22) PCT Filed: Aug. 24, 2020

(86) PCT No.: PCT/CN2020/110759
§ 371 (c)(1),
(2) Date: Mar. 30, 2022

(87) PCT Pub. No.: WO2021/063133
PCT Pub. Date: Apr. 8, 2021

(65) Prior Publication Data
US 2022/0368467 A1    Nov. 17, 2022

(30) Foreign Application Priority Data

Sep. 30, 2019    (CN) .......................... 201910941675.9

(51) Int. Cl.
*H04L 1/1812*    (2023.01)
*H04W 4/40*    (2018.01)

(52) U.S. Cl.
CPC ............. *H04L 1/1816* (2013.01); *H04W 4/40* (2018.02)

(58) Field of Classification Search
CPC .............................. H04L 1/1816; H04W 4/40
See application file for complete search history.

(56) References Cited

U.S. PATENT DOCUMENTS

| 9,794,976 | B2   | 10/2017 | Sartori et al. |
| 11,252,753 | B2 * | 2/2022 | Chen ..................... H04L 1/1887 |
| 2020/0037343 | A1 * | 1/2020 | He ..................... H04W 28/0268 |

(Continued)

FOREIGN PATENT DOCUMENTS

| CN | 108923894 A | 11/2018 |
| CN | 109983724   | 7/2019  |
| CN | 110708145 A | 1/2020  |

(Continued)

OTHER PUBLICATIONS

JPO Notice of Reasons for Refusal for corresponding JP Application No. 2022-520032; Issued on May 11, 2023.

(Continued)

*Primary Examiner* — Duc C Ho
(74) *Attorney, Agent, or Firm* — CANTOR COLBURN LLP

(57) ABSTRACT

An HARQ process management method and apparatus, a terminal, and a storage medium are provided. The HARQ process management method includes: receiving SCI; determining whether the SCI indicates a HARQ process identity to obtain a first determination result and determining a HARQ process associated with the SCI based on the first determination result.

13 Claims, 4 Drawing Sheets

(56) References Cited

U.S. PATENT DOCUMENTS

2020/0092692 A1    3/2020  Wang et al.
2021/0250131 A1*  8/2021  Fan ........................ H04L 1/1854

FOREIGN PATENT DOCUMENTS

| JP | 2016527845 A | 9/2016 |
|----|--------------|--------|
| WO | 2015021185 A1 | 2/2015 |
| WO | 2019027304 A1 | 2/2019 |
| WO | 2019137356 A1 | 7/2019 |

OTHER PUBLICATIONS

Asustek, "Discussion on handling multiple S L communication", 3GPP TSG-RAN WG2 Meeting #107, R2-1911222, Aug. 26-30, 2019, 6 pages.
Catt, "Discussion on physical layer procedures in NR V2X", 3GPP TSG RAN WG1 Meeting #96, R1-1901993, Feb. 25-Mar. 1, 2019, 9 pages.
EPO Partial Supplemental European Search Report for corresponding EP Application No. 20872904.6; Issued on Oct. 19, 2022.
Lenovo et al., "SL HARQ operation", 3GPP TSG RAN WG2 Meeting #107, R2-1910086, Aug. 26-30, 2019, 4 pages.
Samsung, "On Physical Layer Procedures for NR V2X", 3GPP TSG RAN WG1 #97, R1-1906941, May 13-17, 2019, 16 pages.
Catt, "Discussion on physical layer procedures in NR V2X", 3GPP TSG RAN1 Meeting #95, R1-1812618, Nov. 12-16, 2018; 8 pages.
Huawei, "Design and contents of PSCCH and PSFCH", 3GPP TSG RAN WG1 Meeting #95, R1-1813554, Nov. 12-16, 2018; 7 pages.
International Search Report for International Application No. PCT/CN2020/110759; Date of Mailing, Nov. 27, 2020.
Lenovo, Motorola Mobility, "SL HARQ operation", 3GPP TSG RAN WG2 Meeting #106, R2-1906733 (resubmission of R2-1904159), May 13-17, 2019; 4 pages.

* cited by examiner

HARQ PROCESS MANAGEMENT METHOD AND APPARATUS, TERMINAL, AND STORAGE MEDIUM

CROSS-REFERENCE TO RELATED APPLICATIONS

This is the U.S. national stage of application No. PCT/CN2020/110759, filed on Aug. 24, 2020. Priority under 35 U.S.C. § 119(a) and 35 U.S.C. § 365(b) is claimed from Chinese Application No. 201910941675.9 filed Sep. 30, 2019, and entitled "HARQ PROCESS MANAGEMENT METHOD AND APPARATUS, TERMINAL, AND STORAGE MEDIUM", the disclosure of which is also incorporated herein by reference.

TECHNICAL FIELD

The present disclosure generally relates to communication technology field, and more particularly, to a Hybrid Automatic Repeat reQuest (HARQ) process management method and apparatus, a terminal, and a storage medium.

BACKGROUND

Information exchange between vehicles and the outside world (Vehicle to X, V2X) is key technology of future intelligent transportation system which mainly focuses on vehicle data transmission solutions based on 3GPP communication standards. V2X communication includes Vehicle to Vehicle (V2V) communication, Vehicle to Infrastructure (V21) communication and Vehicle to People (V2P) communication. V2X applications will improve driving safety, mitigate congestion, reduce vehicle energy consumption, improve traffic efficiency and enrich in-vehicle infotainment.

In V2X communication, V2V communication is a communication different from ordinary wireless cellular network communication. In traditional cellular network, a User Equipment (UE) communicates with a base station equipment, while in V2V communication, a UE directly communicates with another UE, where a link between the UEs is called a Sidelink (SL).

In a 4G LTE communication system, V2X sidelink communication is based on broadcast communication, and adopts a "one-to-all" communication mode. In this communication mode, a receiving device does not need to feed back to a sending device whether information has been received successfully. If one transmission is not enough to meet reliability requirements of services, the sending device can retransmit data packets a specified number of times without feedback. In 5G NR communication systems, unicast V2X communication is introduced, and a "one-to-one" communication mode is adopted. In this case, the receiving device can feed back to the sending device whether information has been successfully received, where ACK represents successful reception, and NACK indicates failed reception. If the reception fails, the sending device can retransmit. Compared with retransmission without feedback, retransmission with feedback improves resource utilization. This mechanism where the sending device uses retransmission for error correction is called a HARQ mechanism.

In NR V2X, due to the introduction of HARQ with feedback and the possibility of more than one retransmissions, Sidelink Control Information (SCI) may be of following forms: SCI indicating a current transmission without carrying HARQ process identity information; SCI indicating a current transmission and a position of a next retransmission or subsequent N retransmissions without carrying HARQ process identity information; SCI indicating a current transmission and being possible to indicate positions of the current transmission and a next retransmission or subsequent N retransmissions without carrying HARQ process identity information, where the current transmission indicated by the SCI is a position of a retransmission resource indicated by a prior SCI; SCI indicating a current transmission and carrying HARQ process identity information; SCI indicating a current transmission and a position of a next retransmission or subsequent N retransmissions, and carrying HARQ process identity information.

SUMMARY

Embodiments of the present disclosure provide a HARQ process management method which adapts to varied SCI forms.

In an embodiment of the present disclosure, a HARQ process management method is provided, including: receiving SCI; determining whether the SCI indicates a HARQ process identity to obtain a first determination result; and determining a HARQ process associated with the SCI based on the first determination result.

In an embodiment of the present disclosure, a storage medium having computer instructions stored therein is provided, wherein when the computer instructions are executed, the above HARQ process management method is performed.

In an embodiment of the present disclosure, a terminal including a memory and a processor is provided, wherein the memory has computer instructions stored therein, and when the processor executes the computer instructions, the above HARQ process management method is performed.

In an embodiment of the present disclosure, a HARQ process release method is provided, including: acquiring a transmission mode; and determining a release manner of a HARQ process based on the transmission mode. Optionally, the transmission mode is associated with the HARQ process.

In an embodiment of the present disclosure, a storage medium having computer instructions stored therein is provided, wherein when the computer instructions are executed, the above HARQ process release method is performed.

In an embodiment of the present disclosure, a terminal including a memory and a processor is provided, wherein the memory has computer instructions stored therein, and when the processor executes the computer instructions, the above HARQ process release method is performed.

DETAILED DESCRIPTION

Figure 1:
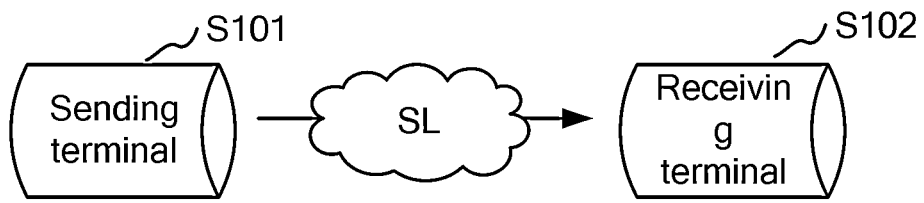
FIG. 1 is an application diagram of a HARQ process management method according to an embodiment.

As described in the background, exiting HARQ process management methods for UE cannot adapt to varied SCI forms.

In embodiments of the present disclosure, a HARQ process management method is provided, including: receiving SCI; determining whether the SCI indicates a HARQ process identity to obtain a first determination result; and determining a HARQ process associated with the SCI based on the first determination result.

A stop-and-wait protocol is adopted by HARQ to send data. In the stop-and-wait protocol, once sending a packet, a sender stops and waits for an acknowledgment, which results in relatively low throughput. Therefore, HARQ uses multiple parallel stop-and-wait processes. When one HARQ process is waiting for acknowledgment, the sender can use another HARQ process to send data. These HARQ processes together form a HARQ entity which combines the stop-and-wait protocol and allows consecutive transmission of data.

A maximum number of HARQ processes of a UE is limited, which limits the number of data that the UE is capable of transmitting simultaneously. When the UE communicates with a base station equipment, the HARQ process is managed by the base station equipment. The base station equipment explicitly or implicitly indicates the HARQ process associated with a current transmission through Downlink Control Information (DCI), and the UE finds a corresponding HARQ buffer based on the DCI. For downlink transmission, if the current transmission is a new transmission, the UE arranges received data into the corresponding HARQ buffer, or if the current transmission is a retransmission, the UE merges the received data with data packets previously received in the HARQ buffer and decodes the merged data. For uplink transmission, if the current transmission is a new transmission, the UE packages uplink data, sends the packaged data to the base station equipment, and arranges it into the corresponding HARQ buffer. If the current transmission is a retransmission, the UE takes out data packet from the corresponding HARQ buffer directly and sends them to the base station equipment.

For example, the UE has 2 HARQ processes, numbered 0 and 1. The base station equipment has data 1, 2 and 3 to be sent to the UE. The base station equipment indicates a first transmission of data 1 and a HARQ process 0 through DCI. After receiving the DCI and data 1, the UE arranges the unsuccessfully decoded data 1 into a HARQ buffer corresponding to the HARQ process 0. Besides, the base station equipment indicates a first transmission of data 2 and a HARQ process 1 through DCI. After receiving the DCI and data 1, the UE arranges the unsuccessfully decoded data 2 into a HARQ buffer corresponding to the HARQ process 1. In this case, there is no idle HARQ process, and data 3 cannot be transmitted temporarily. Subsequently, the base station equipment transmits data 1 and data 2 for a second time respectively. After receiving the retransmitted data 1 and data 2, the UE merges the retransmitted data with data in the HARQ buffers corresponding to the HARQ processes 0 and 1 respectively, and decodes the merged data. In this case, data 1 is successfully decoded, while data 2 is still not successfully decoded, and continues to be cached in the buffer corresponding to the HARQ process 1. Based on data 1 being successfully transmitted, the base station equipment indicates a first transmission of data 3 and a HARQ process 0 through DCI. The UE arranges the unsuccessfully decoded data 3 into a HARQ buffer corresponding to the HARQ process 0 to cover data 1 therein. From above, it is known that the HARQ process of the UE is completely controlled by the base station equipment.

When UEs communicate with each other through sidelink, management of HARQ processes becomes more complicated. One of the reasons is that a UE may communicate with multiple other UEs simultaneously, and the HARQ process in HARQ entities need to be allocated among multiple UEs. For example, UE 1 and UE 2 are both sending data to UE 3 which has at most three HARQ processes used to receive data. If UE 1 occupies all the three HARQ processes, and UE 2 also sends data to UE 3, UE 3 drops the data sent by UE 2. That is, packet loss may occur when there is no idle HARQ process for UE 3. This is caused due to limitation of UE's capability, and there is no solution. For another example, UE 1 used to occupy all HARQ processes of UE 3, but does not need so many HARQ processes currently (for example, a data amount of UE 1 becomes smaller). However, UE 3 is not aware of this. Only after UE 1 completes all data transmission with UE 3 and disconnects from UE 3, UE 3 can know that the HARQ processes previously occupied by UE 1 can be allocated to data sent from UE 2.

Although broadcast communication does not have ACK/NACK feedback, broadcast has blind retransmission, that is, transmitting data packets for a specified number of times (in LTE V2X, at most one retransmission). Broadcast also needs HARQ process management. In LTE V2X, both initial transmission and retransmission are indicated by the same SCI sent by a sending UE to a receiving UE, that is, resource positions of initial transmission and retransmission are determined in response to the UE receiving the SCI. Therefore, for UE, SCI does not need to carry identity information of a HARQ process. As the HARQ process is directly associated with the SCI, the HARQ process is released after transmission indicated by the SCI (including initial transmission and retransmission) is completed, and can be used for subsequently received SCI.

When a HARQ entity receives data of multiple UEs, and SCI have various forms, management of HARQ processes becomes a problem. The UE needs to know a status, for example, available or unavailable, of a particular HARQ process at a particular time.

In order to clarify the objects, characteristics and advantages of the disclosure, embodiments of present disclosure will be described in detail in conjunction with accompanying drawings.

Referring to FIG. 1, FIG. 1 is an application diagram of a HARQ process management method according to an embodiment. A sending terminal 101 and a receiving terminal 102 communicate through Sidelink, where the sending terminal 101 sends data to the receiving terminal 102, and the receiving terminal 102 enables one or more HARQ processes to realize concurrent reception of multiple data. Technical solutions of the present disclosure are applicable to 5G communication systems, and other communication systems, such as 4G, 3G communication systems, or next-generation communication systems after 5G. The technical solutions of the present disclosure are also applicable to different network architectures, including but not limited to a Vehicle-to-Everything (V2X) architecture, and can be applied to Internet of Vehicles scenarios, such as NR V2X scenarios. The method provided in the embodiment may be performed by a UE, for example, by the sending terminal 101.

Figure 2:
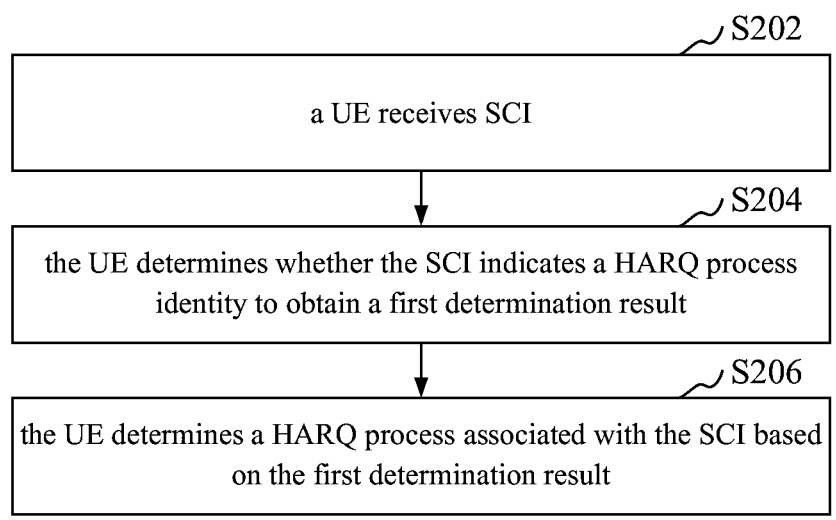
FIG. 2 is a flow chart of a HARQ process management method according to an embodiment.

Referring to FIG. 2, FIG. 2 is a flow chart of a HARQ process management method according to an embodiment. The method may include S202, S204 and S206.

In S202, a UE receives SCI.

In a scenario where UEs communicate through SL, an initial transmission and retransmission of data are both indicated by a sending terminal sending SCI to a receiving terminal. Based on receiving the SCI, the receiving terminal may predict that the sending terminal will send data to it, and needs to specify HARQ processes for receiving the data, and the number of HARQ processes that the receiving terminal can run simultaneously is determined by device capability such as a memory size of the receiving terminal.

In S204, the UE determines whether the SCI indicates a HARQ process identity to obtain a first determination result.

In a practical SL data transmission process, the SCI may indicate the HARQ process identity. In response to receiving the SCI, the UE determines whether the SCI indicates the HARQ process identity. The HARQ process identity uniquely identifies the HARQ process.

In S206, the UE determines a HARQ process associated with the SCI based on the first determination result.

The first determination result in S204 may include: the SCI indicating the HARQ process identity; or the SCI not indicating the HARQ process identity. An association rule may be preset on the receiving terminal to associate a HARQ process with the received SCI based on the first determination result, and the receiving terminal associates a HARQ process for receiving data corresponding to the SCI with the first determination result for the SCI based on the preset association rule. After the receiving terminal specifies the HARQ process of the data, both initial transmission and retransmission of the data are performed in the HARQ process.

The above HARQ process management method may be applied to the receiving terminal as shown in FIG. 1. During the SL communication process, the receiving terminal associates the HARQ process for receiving data corresponding to the SCI based on whether the SCI received in the data transmission process indicates the HARQ process identity, so as to realize effective allocation of HARQ processes for data reception on the receiving terminal.

Figure 3:
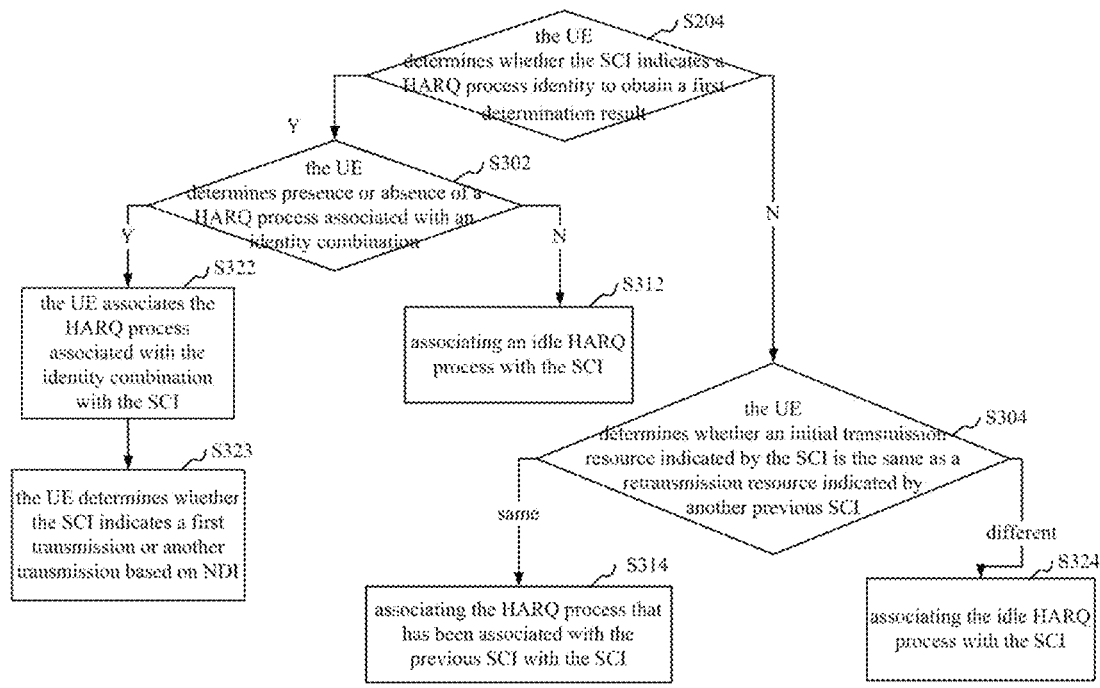
FIG. 3 is a partial flow chart of a HARQ process management method according to an embodiment.

In some embodiments, referring to FIG. 3, following determining whether the SCI indicates the HARQ process identity in S204 as shown in FIG. 2, based on the SCI indicating the HARQ process identity, the method goes to S302 of determining presence or absence of a HARQ process associated with an identity combination, wherein the identity combination includes the HARQ process identity; and performing S312 of associating an idle HARQ process with the SCI based on the absence of the HARQ process associated with the identity combination.

The identity combination includes the HARQ process identity. Besides the HARQ process identity, the identity combination may also include other identifications corresponding to data to be transmitted, such as a source identity representing the sending terminal, or a target identity representing the receiving terminal.

The receiving terminal may determine whether the SCI corresponds to initial transmission or retransmission of the data based on presence or absence of the HARQ process associated with the identity combination. Based on absence of the HARQ process associated with the identity combination, the SCI corresponds to initial transmission of the data, and the receiving terminal allocates an idle HARQ process associated with the identity combination. This HARQ process is used for transmitting data, and subsequent retransmission of the data are all performed on this HARQ process.

In above embodiments, the receiving terminal further determines presence or absence of a HARQ process associated with an identity combination based on the SCI indicating the HARQ process identity. Based on absence of the HARQ process associated with the identity combination, the SCI corresponds to initial transmission of the data, and the receiving terminal allocates an idle HARQ process associated with the SCI and for receiving data to be transmitted corresponding to the SCI.

Still referring to FIG. 3, in some embodiments, in S302 of determining presence or absence of the HARQ process associated with the identity combination, based on presence of the HARQ process associated with the identity combination, S322 and S323 are performed.

In S322, the UE associates the HARQ process associated with the identity combination with the SCI.

Based on presence of the HARQ process associated with the identity combination locally, if it is detected that there is an occupied HARQ process locally associated with a combination of a source identity, a target identity and a HARQ process identity in the SCI, the sending terminal may repeatedly send the SCI corresponding to the same data, and associate the HARQ process associated with the identity combination with the SCI, where the same HARQ process may be associated with multiple SCI.

In S323, the UE determines whether the SCI indicates a first transmission or another transmission based on NDI.

The NDI is used to determine whether it is a new transmission. The NDI being toggled, such as from 0 to 1, or from 1 to 0, represents a new transmission. The NDI being not flipped represents not a new transmission.

That is, if the NDI of the HARQ process corresponding to the SCI is toggled, the UE determines that data received on the HARQ process associated with the identity combination indicated by the SCI is a new data transmission; and if the NDI is not toggled, the UE determines that the data received on the HARQ process associated with the identity combination indicated by the SCI is a data retransmission.

In the above embodiments, the UE associates the HARQ process associated with the identity combination with the SCI based on the presence of the HARQ process associated with the identity combination, continues to receive corresponding transmission data on the HARQ process, and determines whether the data transmission is a new transmission or a retransmission based on the NDI of the HARQ process.

Still referring to FIG. 3, in some embodiments, following determining whether the SCI indicates a HARQ process identity, S204 in FIG. 2 may further include: performing S304 of determining whether an initial transmission resource indicated by the SCI is the same as a retransmission resource indicated by other prior SCI, based on the SCI not indicating the HARQ process identity; and performing S314 of associating a HARQ process associated with the other prior SCI with the SCI, based on the initial transmission resource indicated by the SCI being the same as the retransmission resource indicated by the other prior SCI.

Specifically, based on the SCI not indicating the HARQ process identity, the UE detects a transmission resource indicated by the SCI and acquires information thereof, and determines whether an initial transmission resource indicated by the SCI is the same as a retransmission resource indicated by another prior SCI. Based on the initial transmission resource indicated by the SCI being the same as the retransmission resource indicated by another prior SCI, the UE associates the HARQ process that has been associated with the prior SCI with the SCI, and further, considers that the SCI indicates a retransmission.

Still referring to FIG. 3, in some embodiments, based on the initial transmission resource indicated by the SCI being different from the retransmission resource indicated by another prior SCI as determined in S304, the UE performs S324 of associating the idle HARQ process with the SCI.

That is, based on the initial transmission resource indicated by the SCI being different from the retransmission resource indicated by another prior SCI, the UE determines the transmission to be a new transmission, and allocates an idle HARQ process to be associated with the SCI.

In some embodiments, for the received SCI that does not indicate the HARQ process identity, HARQ process allocation may also be performed based on the above operation, so as to realize effective HARQ process management in various situations.

Referring to FIGS. 2 and 3, in some embodiments, following steps may be included. In S202, the UE receives SCI. In S304, the UE determines whether an initial transmission resource indicated by the SCI is the same as a retransmission resource indicated by another prior SCI. Based on the initial transmission resource indicated by the SCI being the same as the retransmission resource indicated by another prior SCI, the UE performs S314 of associating the HARQ process that has been associated with the prior SCI with the SCI. Based on the initial transmission resource indicated by the SCI being different from the retransmission resource indicated by another prior SCI, the UE performs S324 of associating the idle HARQ process with the SCI.

More specific implementation manners of the embodiment may be referred to the foregoing embodiments, and are not described in detail here.

In some embodiments, the UE merely receives the SCI that does not indicate the HARQ process identity. For example, the standards merely introduce the SCI that does not indicate the HARQ process identity. Alternatively, the UE is configured to merely receive the SCI that does not indicate the HARQ process identity. Therefore, the UE does not perform S204.

In an embodiment of the present disclosure, a HARQ process management method for HARQ process release is provided. The HARQ process release includes: receiving SCI; determining whether the SCI indicates retransmission information to obtain a second determination result; and determining a release manner of the HARQ process based on the second determination result.

Said releasing the HARQ process refers to switching the HARQ process to an idle state, for example, clearing a HARQ buffer corresponding to the HARQ process, or not doing any processing, only when the UE has new data to arrive subsequently, overwriting the HARQ buffer of the HARQ process with new data.

The retransmission information indicates on the SCI whether data is retransmitted. Specifically, the retransmission information may be a retransmission index in the SCI which occupies 1 bite. Based on a value of the retransmission index being 0, the SCI does not indicate the retransmission information; and based on the value of the retransmission index being 1, the SCI indicates the retransmission information. Specifically, in response to receiving the SCI, the terminal associates a HARQ process for receiving data for the SCI, determines whether retransmission information is indicated in the SCI, and executes a following corresponding release rule based on a determination result. Based on the HARQ process meeting the release rule, the UE releases the corresponding HARQ process as an idle process to perform other reception tasks.

In some embodiments, different release rules are executed for HARQ processes associated with SCI based on whether the SCI indicates retransmission information. Based on the HARQ process meeting the corresponding release rule, the associated HARQ process is released, so that an unused HARQ process is released to be idle in time for receiving other data reception tasks, so as to realize flexible allocation of HARQ processes.

Figure 4:
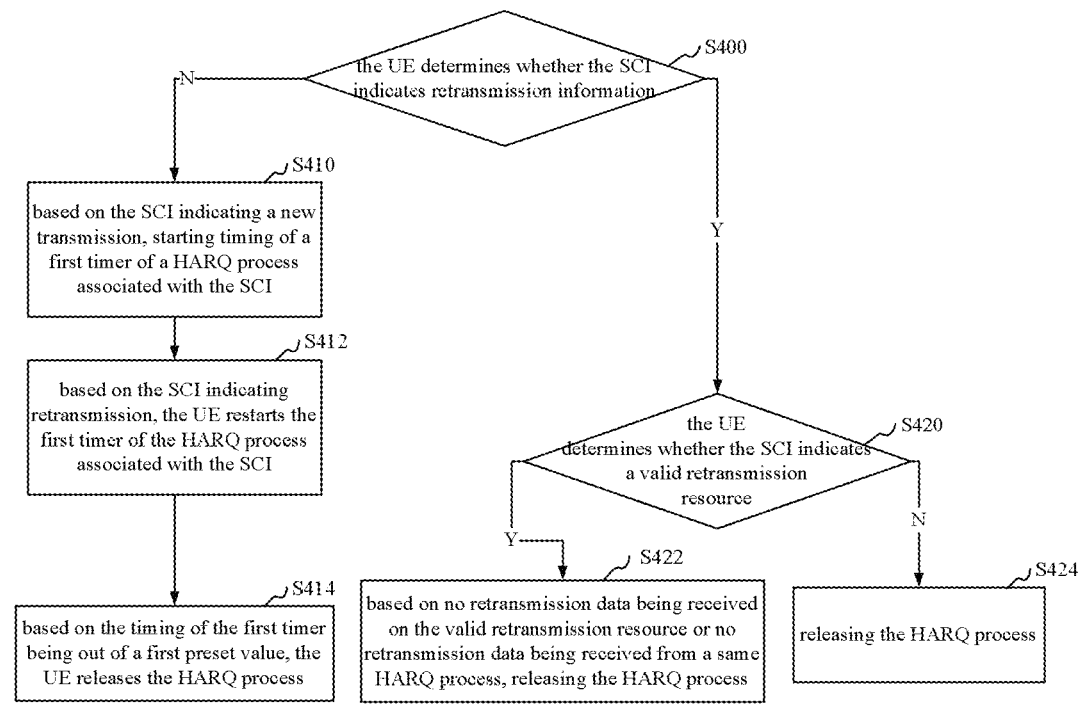
FIG. 4 is a flow chart of a HARQ process release procedure in a HARQ process management method according to an embodiment.

Referring to FIGS. 2 and 4, in some embodiments, FIG. 4 is a flow chart of a HARQ process release procedure according to an embodiment, including: S202 of receiving SCI; S400 of determining whether the SCI indicates retransmission information; and S410 of based on the SCI not indicating the retransmission information, and the SCI indicating a new transmission, starting timing of a first timer of a HARQ process associated with the SCI.

Based on the SCI not indicating the retransmission information, S410 to S412 are performed. Based on the SCI indicating a new transmission, the UE starts monitoring of the HARQ process associated with the SCI, i.e., starting the first timer which is used to monitor a duration of the HARQ process which is associated with the SCI and used to receive transmission data corresponding to the SCI.

In S412, based on the SCI indicating retransmission, the UE restarts the first timer of the HARQ process associated with the SCI.

Specifically, after the first timer starts timing, based on retransmission data of the data transmitted on the HARQ process being received in the HARQ process, the first timer is restarted and the timing is restarted.

In S414, based on the timing of the first timer being out of a first preset value, the UE releases the HARQ process.

The first preset value is used for determining whether a single transmission times out, which may be set based on a practical situation and should be greater than a retransmission time gap.

Based on the timing of the first timer being out of the first preset value, it is indicated that the last transmission of the retransmission data times out, and the HARQ process is released. A number of times the HARQ process receives retransmission data may be one or more, and may be determined based on practical situations. Each time the HARQ process receives retransmission data, the first timer of the HARQ process is restarted, and the timing is restarted.

In some embodiments, based on a HARQ process associated with SCI is used for a new transmission, a first timer is started to timing, and based on data thereon is retransmitted, the first timer is restarted to retiming. Based on the first timer times out, it is indicated that the last data retransmission times out, and the HARQ process is released. In some embodiments, said determining a release manner of the HARQ process based on the second determination result includes: based on the SCI not indicating the retransmission information and transmission data indicated by the SCI being for new transmission, starting a first timer and a second timer of the HARQ process associated with the SCI; in response to receiving retransmission data on the HARQ process associated with the SCI, restarting the first timer; and in response to timing of the first timer being out of a first preset value and timing of the second timer being out of a second preset value, releasing the HARQ process associated with the SCI.

In response to receiving newly transmitted data and associating the HARQ process with the SCI, in addition to starting the first timer to perform corresponding operations in S410 to S414 as shown in FIG. 4, the UE further starts a second timer to timing to monitor a total time that the HARQ process is associated. Based on both the first timer and the second timer timing out, that is, the HARQ process being associated for a too long time, it is considered that the last retransmission times out and the HARQ process is released.

In some embodiments, the first timer and the second timer are simultaneously started to monitor single data transmission on the HARQ process and association of the HARQ process, respectively, so as to more accurately determine whether data on the HARQ process is transmitted correctly. In some embodiments, said determining a release manner of the HARQ process based on the second determination result includes: based on the SCI not indicating the retransmission information and transmission data indicated by the SCI is for new transmission, starting a second timer of the HARQ process associated with the SCI to start timing; and in response to the timing of the second timer being out of a second preset value, releasing the HARQ process associated with the SCI.

It is also possible to merely start the second timer to monitor an association time of the HARQ process, and based on the second timer timing out, the receiving terminal releases the HARQ process. The second preset value corresponding to the second timer may be set based on resource allocation requirements of the receiving terminal.

Still referring to FIG. 4, in some embodiments, based on the SCI indicating the retransmission information in S400, the UE further perform S420 of determining whether the SCI indicates a valid retransmission resource.

Based on the SCI indicating the retransmission information, a releasing rule is executed based on following S420 and S422.

Validity of the retransmission resource indicated in the SCI is determined. For example, transmission information of data to be transmitted corresponding to the SCI received on the retransmission resource is detected, such as detecting whether a combination of a source identity, a target identity and a HARQ process identity corresponding to the data to be transmitted is received on the retransmission resource. If it is received, the retransmission resource can be used to transmit the data, that is, the SCI indicates a valid retransmission resource; otherwise, the SCI does not indicate a valid retransmission resource.

Another basis for determining that the retransmission resource indicated in the SCI is invalid may include the receiving terminal receiving the SCI not indicating the retransmission resource, such as indicating that a number of remaining retransmissions is 0, or indicating that a time gap between a next transmission and the current transmission is 0.

Based on the SCI indicating the valid retransmission resource, the UE performs S422 including: based on no retransmission data being received on the valid retransmission resource or no retransmission data being received from a same HARQ process, releasing the HARQ process. Two situations are considered here. The first is that the retransmission resource can merely be used for retransmission, and is released if retransmission is not required, and the second is that the retransmission resource can be used for a new transmission.

In some embodiments, following S420 of determining whether the SCI indicates a valid retransmission resource, the method further includes: based on the SCI not indicating the valid retransmission resource, performing S424 of releasing the HARQ process.

In the above S420, based on the SCI not indicating the valid retransmission resource, the UE releases the HARQ process.

Based on S420 to S424, the HARQ process release rule based on the SCI indicating the retransmission information is provided.

Referring to FIG. 4, in some embodiments, the HARQ process release method includes S202, S410, S412 and S414. In S202, the UE receives SCI. In S410, the UE starts or restarts the first timer of the HARQ process associated with the SCI based on the SCI indicating a new transmission. In S412, the UE starts or restarts the first timer of the HARQ process associated with the SCI based on the SCI indicating a retransmission. In S414, the UE releases the HARQ process based on timing of the first timer being out of a first preset value.

Details of S202, S410, S412 and S414 may be referred to the above embodiments, and are not repeated here.

In the embodiment, the UE merely receives SCI that does not indicate retransmission information. For example, the standards merely introduce SCI that does not indicate retransmission information, or the UE is configured to merely receive SCI that does not indicate retransmission information. Therefore, the UE does not perform S400.

In some embodiments, the HARQ process release method includes: receiving SCI; based on the SCI indicating a new transmission, starting or restarting a first timer and a second timer of the HARQ process associated with the SCI; based on the SCI indicating a retransmission, starting or restarting the first timer of the HARQ process associated with the SCI; and in response to timing of the first timer being out of a first preset value and timing of the second timer being out of a second preset value, releasing the HARQ process associated with the SCI.

More specific implementation manners of the embodiment may be referred to the above embodiments, and are not repeated here.

In some embodiments, the method for releasing the HARQ process includes: receiving SCI; based on the SCI indicating a new transmission, starting or restarting a second timer of the HARQ process associated with the SCI; and in response to timing of the second timer being out of a second preset value, releasing the HARQ process associated with the SCI.

More specific implementation manners of the embodiment can be referred to the above embodiments, and are not repeated here.

Referring to FIG. 2 and FIG. 4, in some embodiments, the HARQ process release method includes S202 and S420.

In S202, the UE receives SCI.

In S420, the UE determines whether the SCI indicates a valid retransmission resource.

Based on the SCI indicating a valid retransmission resource, S422 is performed, i.e., the UE releases the HARQ process based on no retransmission data being received on the valid retransmission resource or no retransmission data being received from a same HARQ process. Two situations are considered here. The first is that the retransmission resource can merely be used for retransmission, and is released if retransmission is not required, and the second is that the retransmission resource can be used for a new transmission. Based on the SCI not indicating a valid retransmission resource, S424 is performed, i.e., the UE releases the HARQ process.

More specific implementation manners of the embodiment can be referred to the above embodiments, and are not repeated here.

In the embodiment, the UE merely receives the SCI that indicates retransmission information. For example, the standards merely introduce the SCI that indicates the retransmission information. Alternatively, the UE is configured to merely receive the SCI that indicates the retransmission information. Therefore, the UE does not perform S400.

Referring to FIG. 4, in some embodiments, the HARQ process release method includes S422. In S422, the UE releases the HARQ process based on no retransmission data being received on the retransmission resource or no retransmission data being received from a same HARQ process. Two situations are considered here. The first is that the retransmission resource can merely be used for retransmission, and is released if retransmission is not required, and the second is that the retransmission resource can be used for a new transmission.

More specific implementation manners of the embodiment can be referred to the above embodiments, and are not repeated here.

In the embodiment, the UE merely receives the SCI indicating the valid retransmission information. For example, the standards merely introduce the SCI indicating the valid retransmission information, or the UE is configured to merely receive the SCI indicating the valid retransmission information. Therefore, the UE does not perform S400 and S420.

In some embodiments, the above HARQ process management method may further include: based on data transmission indicated by the SCI being completed on the HARQ process, releasing the HARQ process associated with the SCI.

In addition, all associated HARQ processes may be released as idle HARQ processes based on data transmission thereon is completed.

The above embodiments together form HARQ process release methods which release occupied HARQ processes based on the corresponding release rules, which can be applied to SCI in various forms, and may flexibly and accurately release the HARQ processes that are not effectively occupied.

In an embodiment of the present disclosure, a HARQ process management method is provided, including: acquiring a transmission mode; and determining a release manner of a HARQ process based on the transmission mode.

Optionally, the transmission mode is associated with the HARQ process.

Optionally, said determining a release manner of a HARQ process based on the transmission mode includes: based on the transmission mode being a base station scheduling mode, and transmission data being new transmission data, starting or restarting a third timer of a HARQ process associated with the SCI, or associated with data indicated by the SCI, or associated with an identity combination indicated by the SCI, wherein the SCI is SCI corresponding to the new transmission data, and the SCI indicates the identity combination; based on the transmission data being retransmission data, restarting the third timer of the HARQ process associated with the SCI, or associated with the data indicated by the SCI, or associated with the identity combination indicated by the SCI, wherein the SCI is SCI corresponding to the retransmission data; and based on timing of the third timer being out of a third preset value, releasing the HARQ process.

Optionally, said determining a release manner of a HARQ process based on the transmission mode includes: based on the transmission mode being a base station scheduling mode, and transmission data being new transmission data, starting or restarting a third timer and a fourth timer of a HARQ process which are associated with the SCI, or associated with data indicated by the SCI, or associated with an identity combination indicated by the SCI, wherein the SCI is SCI corresponding to the new transmission data; based on the transmission data being retransmission data, restarting the third timer of the HARQ process associated with the SCI, or associated with the data indicated by the SCI, or associated with the identity combination indicated by the SCI, wherein the SCI is SCI corresponding to the retransmission data; and based on timing of the third timer being out of a third preset value and timing of the fourth timer being out of a fourth preset value, releasing the HARQ process.

Optionally, said determining a release manner of a HARQ process based on the transmission mode includes: based on the transmission mode being a base station scheduling mode, and transmission data being new transmission data, starting or restarting a fourth timer of a HARQ process associated with the SCI, or associated with data indicated by the SCI, or associated with an identity combination indicated by the SCI, wherein the SCI is SCI corresponding to the new transmission data; and based on timing of the fourth timer being out of a fourth preset value, releasing the HARQ process.

Optionally, said determining a release manner of a HARQ process based on the transmission mode includes: based on the transmission mode being a self-selection transmission mode, and a number of data transmissions on the HARQ process reaching a preset number of times, releasing the HARQ process.

In order to clarify the objects, characteristics and advantages of the disclosure, embodiments of present disclosure will be described in detail in conjunction with accompanying drawings.

Figure 5:
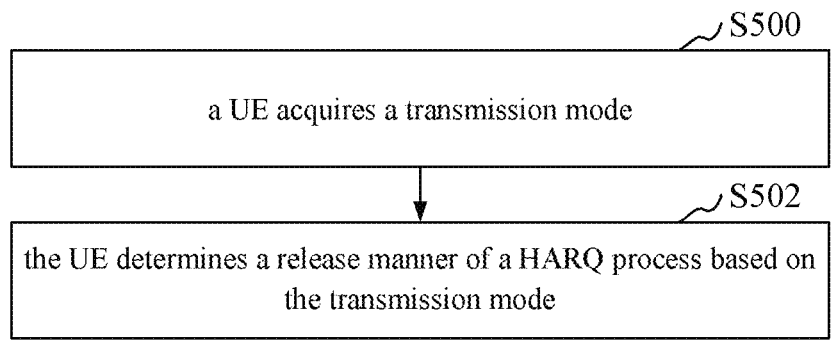
FIG. 5 is a flow chart of a HARQ process release method according to an embodiment.

Referring to FIG. 5, FIG. 5 is a flow chart of a HARQ process release method according to an embodiment.

In S500, a UE acquires a transmission mode.

In S502, the UE determines a release manner of a HARQ process based on the transmission mode.

For a sending terminal in V2V communication, different HARQ processes may be started for data transmission, and be set based on requirements, such as in one-to-one correspondence with receiving terminal, or in one-to-one correspondence with sent data. A number of HARQ processes that the sending terminal can run concurrently is determined by device capabilities such as a memory size of the sending terminal.

Based on a need to transmit data, the sending terminal acquires an idle HARQ process to perform the data transmission task. Based on the data transmission task being completed on the HARQ process, the HARQ process is released as an idle process. For the HARQ process that has been used to perform the data sending task, a release rule may be set based on a transmission mode for sending data. Based on the HARQ process meeting the release rule, the HARQ process is released as an idle process to be used to perform other transmission tasks. Said releasing the HARQ process refers to switching the HARQ process to an idle state, for example, clearing a HARQ buffer corresponding to the HARQ process, or not doing any processing, only when the UE has new data to arrive subsequently, overwriting the HARQ buffer of the HARQ process with new data.

The method in the embodiment may be applied to the sending terminal as shown in FIG. 1. For the sending terminal of data transmission, one or more HARQ processes may be started to execute multiple data sending tasks concurrently. The sending terminal releases unused HARQ processes as idle processes based on release rules, so as to accurately determine usage of the HARQ processes.

Figure 6:
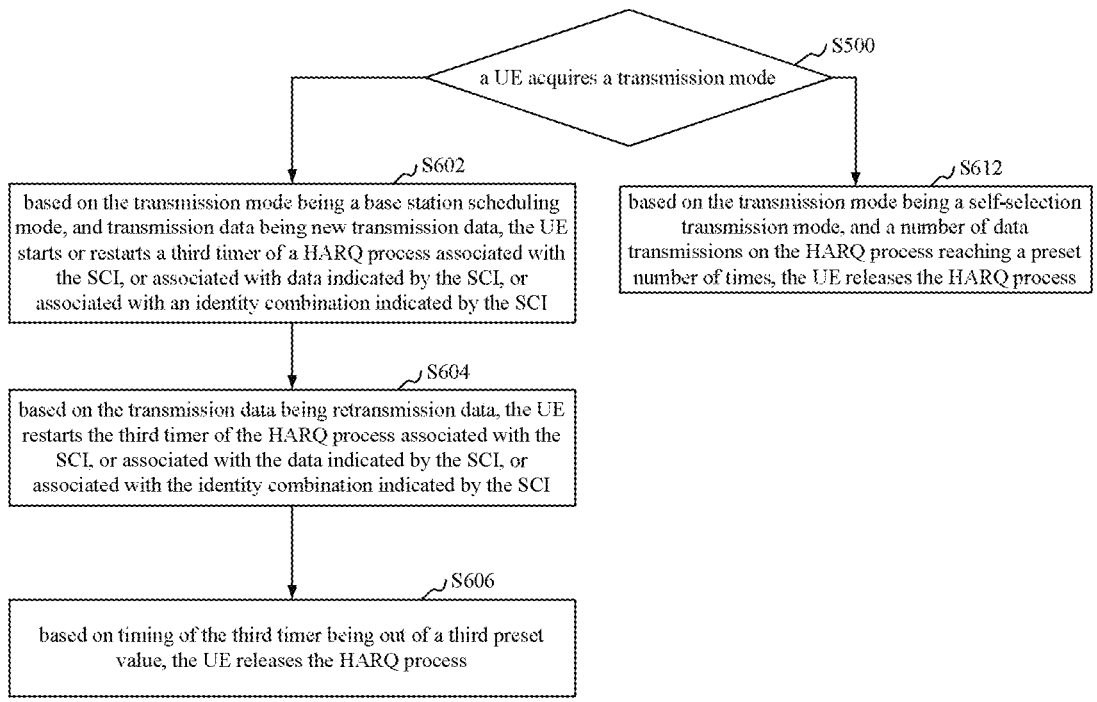
FIG. 6 is a flow chart of a HARQ process release method according to an embodiment.

Referring to FIG. 6, FIG. 6 is a flow chart of a HARQ process release method according to an embodiment. In the embodiment, following S500 as shown in FIG. 5, the method may further include S602, S604 and S606.

In S602, based on the transmission mode being a base station scheduling mode, and transmission data being new transmission data, the UE starts or restarts a third timer of a HARQ process associated with the SCI, or associated with data indicated by the SCI, or associated with an identity combination indicated by the SCI, wherein the SCI indicates the identity combination.

The SCI refers to SCI associated with data sent currently to the receiving terminal before or when the data is sent currently. In the base station scheduling mode, prior to sending data to the receiving terminal, the sending terminal sends to the receiving terminal the SCI corresponding to transmission data.

Based on transmission data being new transmission data, the UE starts to monitor a HARQ process associated with the SCI, data indicated by the SCI, or an identity combination indicated by the SCI, and releases the current HARQ process based on it meeting release requirements. The SCI is SCI corresponding to the new transmission data. Based on the HARQ process being associated with the corresponding SCI, or the data indicated by the SCI, or the identity combination indicated by the SCI, the sending terminal starts or restarts the third timer corresponding to the HARQ process to start timing.

The identity combination is a combination of several identities used to indicate transmission data, and may include a source identity representing the sending terminal, a target identity representing the receiving terminal, and a HARQ process identity, and etc.

In S604, based on the transmission data being retransmission data, the UE restarts the third timer of the HARQ process associated with the SCI, or associated with the data indicated by the SCI, or associated with the identity combination indicated by the SCI, wherein the SCI is SCI corresponding to the retransmission data.

Based on data sent by the sending terminal being retransmission data, the UE starts or restarts the third timer of the HARQ process associated with the SCI, or associated with the data indicated by the SCI, or associated with the identity combination indicated by the SCI, where the third timer monitor a situation of each data transmission on the corresponding HARQ process.

In S606, based on timing of the third timer being out of a third preset value, the UE releases the HARQ process.

The third preset value is set for the third timer to determine whether each data transmission times out, and is greater than a retransmission time gap. Timing of the third timer being out of the third preset value represents that the last retransmission task times out, and accordingly the HARQ process is released.

In the embodiment, based on the HARQ process being associated with the SCI, or the data indicated by the SCI, or the identity combination indicated by the SCI, the sending terminal starts or restarts the third timer. Each time data associated with the HARQ process is newly transmitted or retransmitted, the third timer is started or restarted. Based on the last data transmission being completed, the HARQ process is released.

In some embodiments, said determining a release manner of a HARQ process based on the transmission mode includes: based on the transmission mode being a base station scheduling mode, and transmission data being new transmission data, starting or restarting a third timer and a fourth timer of a HARQ process which are associated with the SCI, or associated with data indicated by the SCI, or associated with an identity combination indicated by the SCI, wherein the SCI is SCI corresponding to the new transmission data; based on the transmission data being retransmission data, restarting the third timer of the HARQ process associated with the SCI, or associated with the data indicated by the SCI, or associated with the identity combination indicated by the SCI, wherein the SCI is SCI corresponding to the retransmission data; and based on timing of the third timer being out of a third preset value and timing of the fourth timer being out of a fourth preset value, releasing the HARQ process.

Based on the transmission data being new transmission data, in addition to starting or restarting the third timer to perform S602 to S606 as shown in FIG. 6, the UE simultaneously starts or restarts the fourth timer to start timing, and monitoring a total time of association of the HARQ process. Based on both the third timer and the fourth timer expiring, that is, the HARQ process having been associated for a too long time, and the last retransmission having errors, the HARQ process is released.

In the embodiment, the third timer and the fourth timer are simultaneously started to monitor the single data transmission on the HARQ process and the association of the HARQ process respectively, so as to more accurately determine whether data transmission on the HARQ process times out. In some embodiments, said determining a release manner of a HARQ process based on the transmission mode includes: based on the transmission mode being a base station scheduling mode, and transmission data being new transmission data, starting or restarting a fourth timer of a HARQ process associated with the SCI, or associated with data indicated by the SCI, or associated with an identity combination indicated by the SCI, wherein the SCI is SCI corresponding to the new transmission data; and based on timing of the fourth timer being out of a fourth preset value, releasing the HARQ process.

It is also possible to merely start the fourth timer to monitor an association time of the HARQ process, and based on the fourth timer timing out, the sending terminal releases the HARQ process. The fourth preset value corresponding to the fourth timer may be set based on resource allocation requirements of the sending terminal. Still referring to FIG. 6, in some embodiments, said determining a release manner of a HARQ process based on the transmission mode further includes S612: based on the transmission mode being a self-selection transmission mode, and a number of data transmissions on the HARQ process reaching a preset number of times, releasing the HARQ process.

In the self-selection transmission mode, the sending terminal determines a target device for data transmission and a number of data retransmissions without scheduling by a base station in V2V transmission. Based on the number of times of data transmission reaching a preset value, that is, the data being not successfully transmitted after multiple times of retransmissions, it is determined that there is an error in the data transmission, and the HARQ process is released.

Referring to FIG. 6, in some embodiments, the HARQ process release method includes S602, S604 and S606. In S602, based on transmission data being new transmission data, the UE starts or restarts a third timer of a HARQ process associated with the SCI, or associated with data indicated by the SCI, or associated with an identity combination indicated by the SCI, wherein the SCI indicates the identity combination. In S604, based on the transmission data being retransmission data, the UE restarts the third timer of the HARQ process associated with the SCI, or associated with the data indicated by the SCI, or associated with the identity combination indicated by the SCI, wherein the SCI is SCI corresponding to the retransmission data. In S606, based on timing of the third timer being out of a third preset value, the UE releases the HARQ process.

Descriptions of S602, S604 and S606 may be referred to the above embodiments, and are not repeated here.

In the embodiment, the UE transmission mode is the base station scheduling mode. For example, the standards merely introduce the base station scheduling mode, or the UE is configured to use merely the base station scheduling mode. Therefore, the UE does not perform S500 and S502. In some embodiments, the HARQ process release method includes: based on transmission data being new transmission data, starting or restarting a third timer and a fourth timer of a HARQ process which are associated with the SCI, or associated with data indicated by the SCI, or associated with an identity combination indicated by the SCI, wherein the SCI is SCI corresponding to the new transmission data; based on the transmission data being retransmission data, starting or restarting the third timer of the HARQ process associated with the SCI, or associated with the data indicated by the SCI, or associated with the identity combination indicated by the SCI, wherein the SCI is SCI corresponding to the retransmission data; and based on timing of the third timer being out of a third preset value and timing of the fourth timer being out of a fourth preset value, releasing the HARQ process.

In some embodiments, the HARQ process release method includes: based on transmission data being new transmission data, starting or restarting a fourth timer of a HARQ process associated with the SCI, or associated with data indicated by the SCI, or associated with an identity combination indicated by the SCI, wherein the SCI is SCI corresponding to the new transmission data; and based on timing of the fourth timer being out of a fourth preset value, releasing the HARQ process.

Above embodiments provide solutions for the sending terminal to determine which occupied HARQ processes can be released as available HARQ processes.

Figure 7:
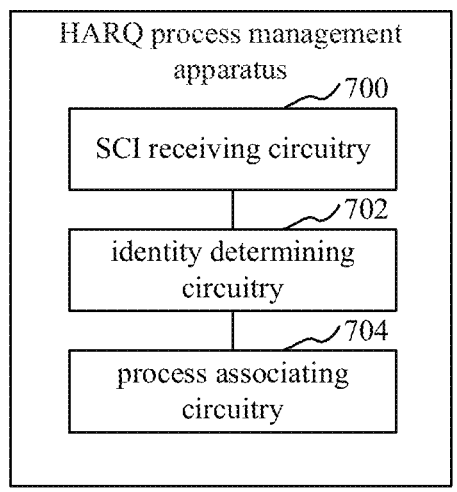
FIG. 7 is a structural diagram of a HARQ process management apparatus according to an embodiment.

Referring to FIG. 7, FIG. 7 is a structural diagram of a HARQ process management apparatus according to an embodiment. Those skilled in the art could understand that the HARQ process management apparatus described in the embodiment may be used to implement the above methods described in the embodiments as shown in FIG. 1 to FIG. 4.

The HARQ process management apparatus includes: an SCI receiving circuitry 700 configured to receive SCI; an identity determining circuitry 702 configured to determine whether the SCI indicates a HARQ process identity to obtain a first determination result; and a process associating circuitry 704 configured to determine a HARQ process associated with the SCI based on the first determination result.

In an embodiment of the present disclosure, a storage medium having computer instructions stored therein is provided, wherein when the computer instructions are executed, any one of the above methods as shown in FIGS. 1 to 4 is performed. In some embodiments, the storage medium may be a computer readable storage medium, and may include a non-volatile or a non-transitory memory, or include a ROM, a RAM, a magnetic disk or an optical disk.

In an embodiment of the present disclosure, a terminal including a memory and a processor is provided, wherein the memory has computer instructions stored therein, and when the processor executes the computer instructions, any one of the above methods as shown in FIG. 1 to FIG. 4 is performed. The terminal may be a UE applied in an NR V2X scenario.

Figure 8:
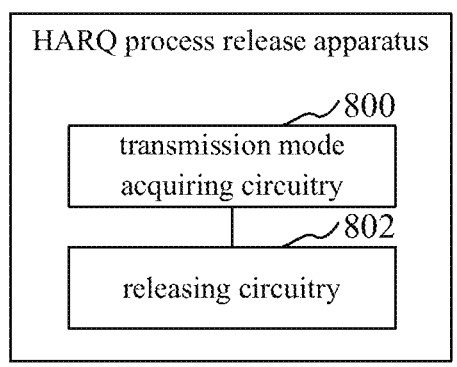
FIG. 8 is a structural diagram of a HARQ process release apparatus according to an embodiment.

Referring to FIG. 8, FIG. 8 is a structural diagram of a HARQ process release apparatus according to an embodiment. Those skilled in the art could understand that the HARQ process release apparatus described in the embodiment may be used to implement the above methods described in the embodiments as shown in FIGS. 1, 5 and 6.

The HARQ process release apparatus includes: a transmission mode acquiring circuitry 800 configured to acquire a transmission mode; and a releasing circuitry 802 configured to determine a release manner of a HARQ process based on the transmission mode.

In an embodiment of the present disclosure, a storage medium having computer instructions stored therein is provided, wherein when the computer instructions are executed, any one of the above methods as shown in FIG. 1, FIG. 5 and FIG. 6 is performed. In some embodiments, the storage medium may be a computer readable storage medium, and may include a non-volatile or a non-transitory memory, or include a ROM, a RAM, a magnetic disk or an optical disk.

In an embodiment of the present disclosure, a terminal including a memory and a processor is provided, wherein the memory has computer instructions stored therein, and when the processor executes the computer instructions, any one of the above methods as shown in FIGS. 1, 5 and 6 is performed. The terminal may be a UE applied in an NR V2X scenario.

In the embodiments of the present disclosure, a core network may be an Evolved Packet Core (EPC), 5G Core Network or a new core network in future communication systems. The 5G Core Network is composed of a set of devices, implements Access and Mobility Management Function (AMF) providing functions such as mobility management function, User Plane Function (UPF) providing functions such as packet routing and forwarding and Quality of Service (QoS) management, and Session Management Function (SMF) providing functions such as session management and IP address allocation and management. EPC can be composed of MME that provides functions such as mobility management and gateway selection, Serving Gateway (S-GW) that provides functions such as data packet forwarding, and PDN Gateway (P-GW) that provides functions such as terminal address allocation and rate control.

The base station in the embodiments of the present disclosure may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The network in the embodiments of the present disclosure refers to a communication network that provides communication services for terminals, including a base station of a radio access network, a base station controller of a radio access network, and a device on a core network side.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In the embodiments of the present disclosure, an unidirectional communication link from an access network to a terminal as a downlink, data transmitted on the downlink is downlink data, and a transmission direction of the downlink data is called a downlink direction. An unidirectional communication link from a terminal to an access network is an uplink, data transmitted on the uplink is uplink data, and a transmission direction of the uplink data is an uplink direction.

It should be understood that the term "and/or" in the present disclosure is merely an association relationship describing associated objects, indicating that there can be three types of relationships, for example, A and/or B can represent "A exists only, both A and B exist, B exists only. In addition, the character "l" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Hybrid Automatic Repeat reQuest (HARQ) process management method, comprising:
   receiving Sidelink Control Information (SCI) which indicates a HARQ process identity; and
   determining a HARQ process associated with the SCI;
   wherein said determining the HARQ process associated with the SCI comprises:
      determining presence or absence of the HARQ process associated with an identity combination, wherein the identity combination is indicated by the SCI and comprises the HARQ process identity; and
      associating an idle HARQ process with the identity combination indicated by the SCI based on the absence of the HARQ process associated with the identity combination.

2. The method according to claim 1, wherein following determining presence or absence of the HARQ process associated with the identity combination, the method further comprises:
   associating the HARQ process associated with the identity combination with the SCI based on the presence of the HARQ process associated with the identity combination; and
   determining whether the SCI indicates a first transmission or another transmission based on new data indicator.

3. The method according to claim 1, further comprising:
   determining whether the SCI indicates retransmission information to obtain a determination result; and
   determining a release manner of the HARQ process based on the determination result.

4. The method according to claim 3, wherein said determining a release manner of the HARQ process based on the determination result comprises:
   based on the SCI not indicating the retransmission information and transmission data indicated by the SCI being for new transmission, starting or restarting a first timer of the HARQ process associated with the SCI to start timing;
   in response to receiving retransmission data of the transmission data, starting or restarting the first timer; and
   in response to the timing of the first timer being out of a first preset value, releasing the HARQ process.

5. The method according to claim 3, wherein said determining a release manner of the HARQ process based on the determination result comprises:
   based on the SCI not indicating the retransmission information and transmission data indicated by the SCI being for new transmission, starting or restarting a first timer and a second timer of the HARQ process associated with the SCI to start timing;
   in response to receiving retransmission data of the transmission data, restarting the first timer; and
   in response to the timing of the first timer being out of a first preset value and the timing of the second timer being out of a second preset value, releasing the HARQ process.

6. The method according to claim 3, wherein said determining a release manner of the HARQ process based on the determination result comprises:
   based on the SCI not indicating the retransmission information and transmission data indicated by the SCI being for new transmission, starting or restarting a second timer of the HARQ process associated with the SCI to start timing; and
   in response to the timing of the second timer being out of a second preset value, releasing the HARQ process.

7. The method according to claim 3, wherein said determining a release manner of the HARQ process based on the determination result comprises:
   based on the SCI indicating the retransmission information, determining whether the SCI indicates a valid retransmission resource; and
   based on the SCI indicating the valid retransmission resource and no retransmission data being received on the valid retransmission resource, releasing the HARQ process.

8. The method according to claim 7, wherein following determining whether the SCI indicates a valid retransmission resource, the method further comprises:
   based on the SCI not indicating the valid retransmission resource, releasing the HARQ process.

9. The method according to claim 3, further comprising:
   based on data transmission indicated by the SCI being completed on the HARQ process, releasing the HARQ process associated with the SCI.

10. A non-transitory storage medium storing one or more programs, the one or more programs comprising computer instructions, which, when executed by a processor, cause the processor to:
    receive Sidelink Control Information (SCI) which indicates a Hybrid Automatic Repeat reQuest (HARQ) process identity; and
    determine a HARQ process associated with the SCI;
    wherein said determining the HARQ process associated with the SCI comprises:
       determining presence or absence of the HARQ process associated with an identity combination, wherein the identity combination is indicated by the SCI and comprises the HARQ process identity; and
       associating an idle HARQ process with the identity combination indicated by the SCI based on the absence of the HARQ process associated with the identity combination.

11. The non-transitory storage medium according to claim 10, wherein the processor is further caused to:
    determine whether the SCI indicates retransmission information to obtain a determination result; and
    determine a release manner of the HARQ process based on the determination result.

12. A terminal comprising a memory and a processor, wherein the memory stores one or more programs, the one or more programs comprising computer instructions, which, when executed by the processor, cause the processor to:
- receive Sidelink Control Information (SCI) which indicates a Hybrid Automatic Repeat reQuest (HARQ) process identity; and
- determine a HARQ process associated with the SCI-based on the first-determination-result;
- wherein said determining the HARQ process associated with the SCI comprises:
  - determining presence or absence of the HARQ process associated with an identity combination, wherein the identity combination is indicated by the SCI and comprises the HARQ process identity, and
  - associating an idle HARQ process with the identity combination indicated by the SCI based on the absence of the HARQ process associated with the identity combination.

13. The terminal according to claim 12, wherein the processor is further caused to:
- determine whether the SCI indicates retransmission information to obtain a determination result; and
- determine a release manner of the HARQ process based on the determination result.

* * * * *